Aug. 19, 1930.    G. H. DAVIS    1,773,521
MECHANISM FOR OPERATING AEROPLANE BRAKES AND SIMILAR STRUCTURES
Filed Sept. 16, 1929    5 Sheets-Sheet 1
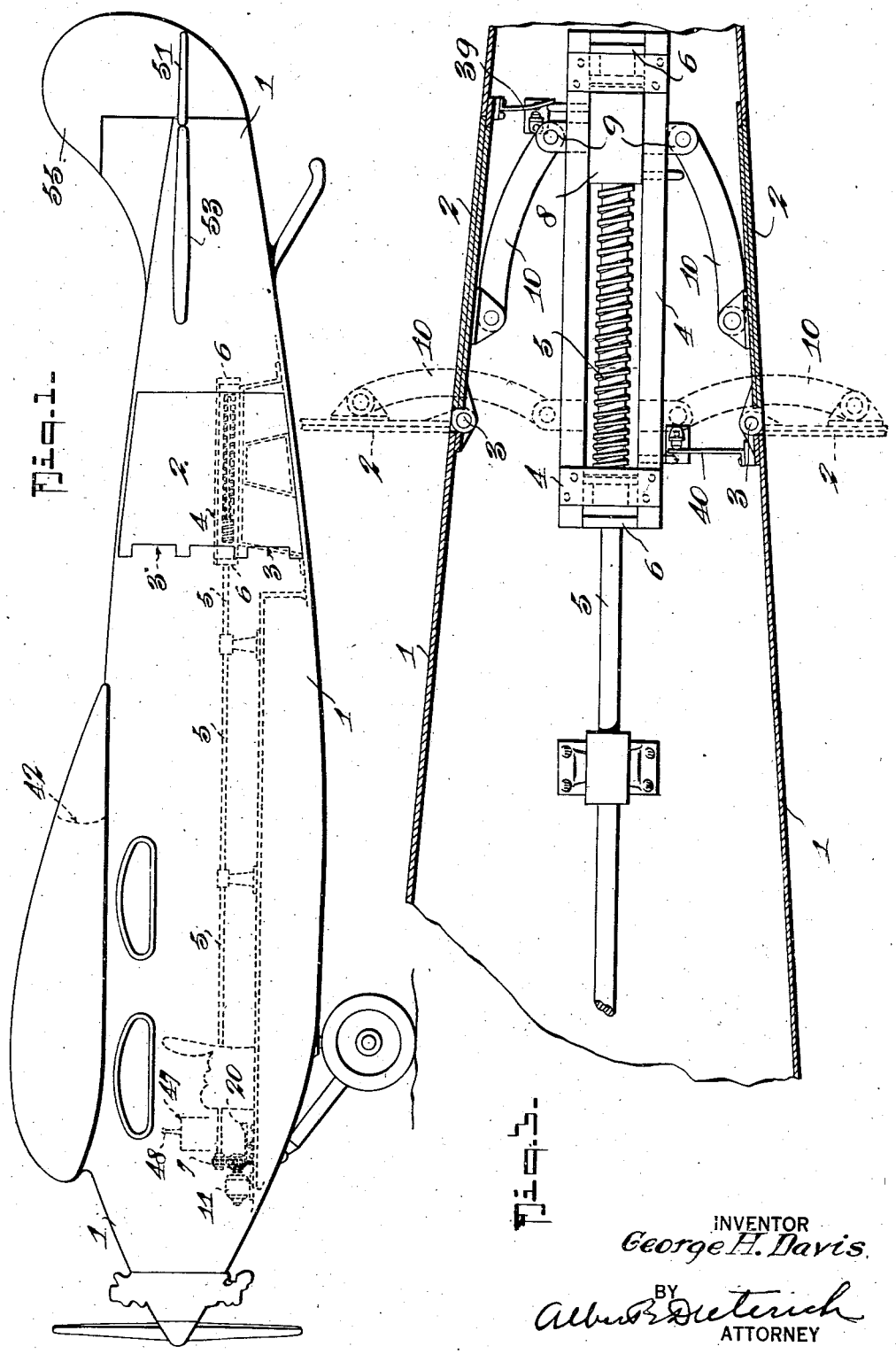
INVENTOR
George H. Davis,
BY
Albert B. Dieterich
ATTORNEY

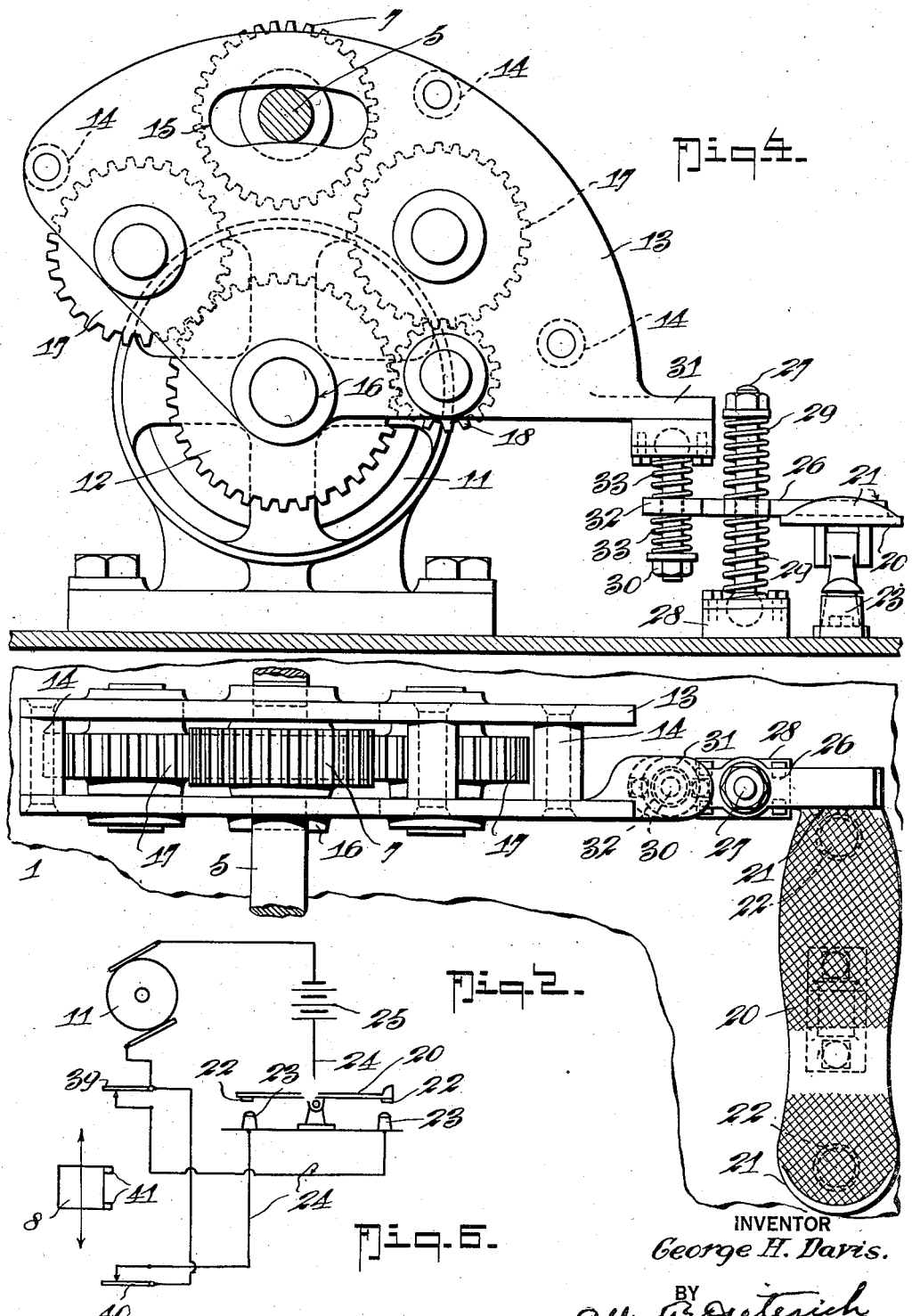

Aug. 19, 1930.  G. H. DAVIS  1,773,521
MECHANISM FOR OPERATING AEROPLANE BRAKES AND SIMILAR STRUCTURES
Filed Sept. 16, 1929    5 Sheets-Sheet 3

INVENTOR
George H. Davis.
BY
ATTORNEY

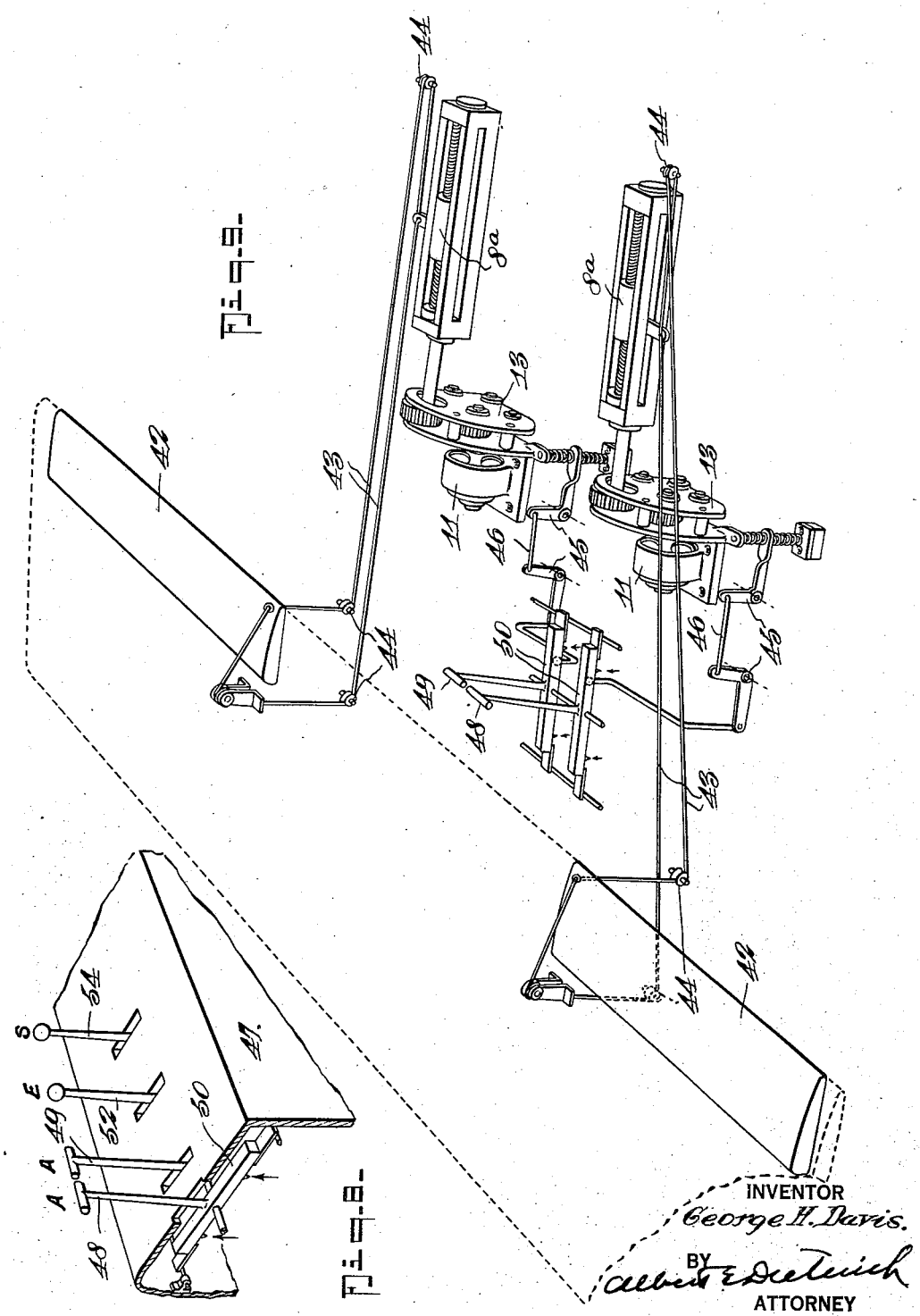

Aug. 19, 1930.  G. H. DAVIS  1,773,521
MECHANISM FOR OPERATING AEROPLANE BRAKES AND SIMILAR STRUCTURES
Filed Sept. 16, 1929  5 Sheets-Sheet 5
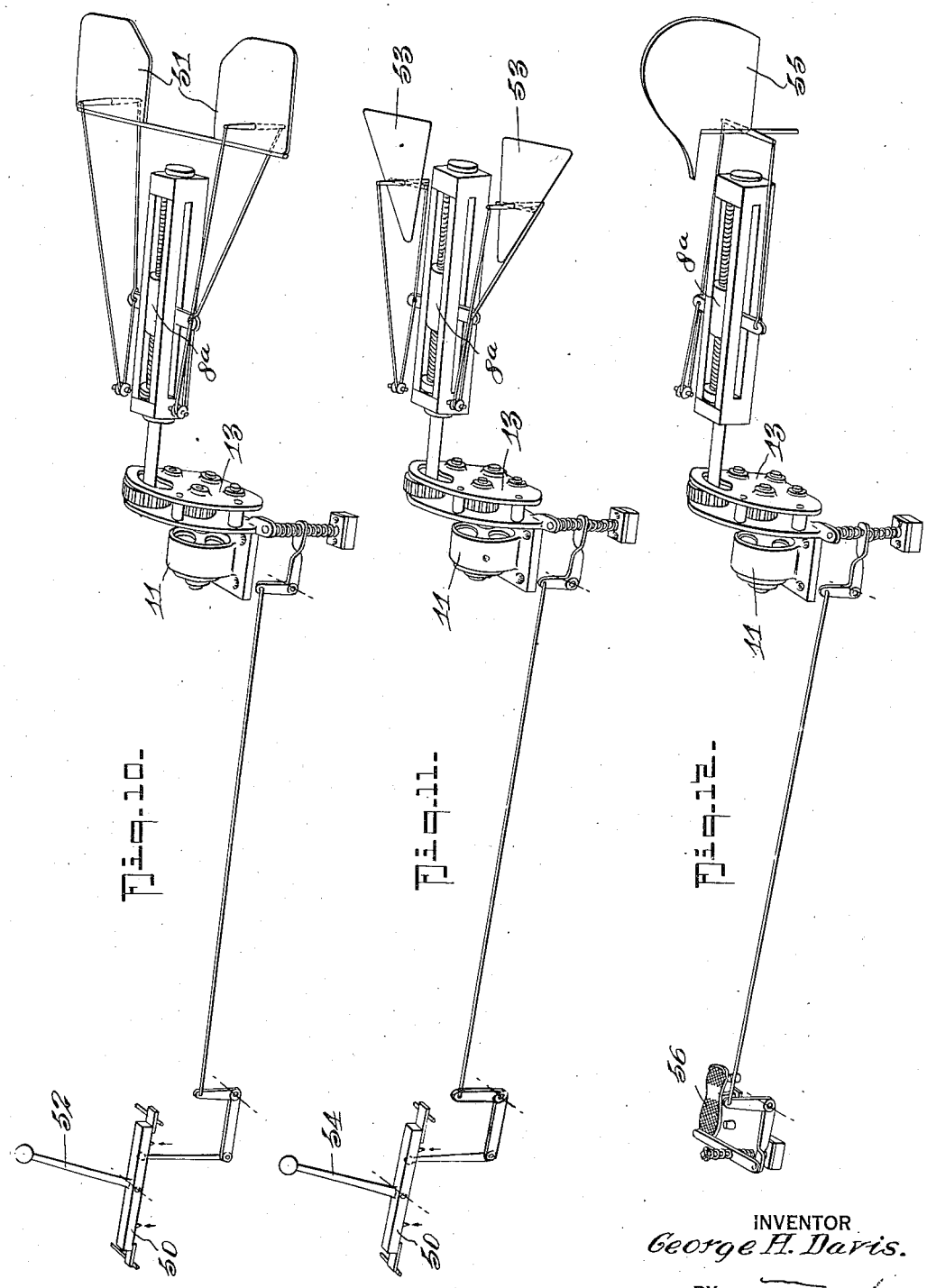
INVENTOR
*George H. Davis.*
BY
*Albert E. Dieterich*
ATTORNEY Patented Aug. 19, 1930

1,773,521

UNITED STATES PATENT OFFICE

GEORGE H. DAVIS, OF RICHMOND, VIRGINIA

MECHANISM FOR OPERATING AEROPLANE BRAKES AND SIMILAR STRUCTURES

Application filed September 16, 1929. Serial No. 392,971.

My invention relates to mechanisms for controlling the action of and operating pivoted plates, wings, gates, rudders, etc. generally, but more particularly air brake plates of aerial navigating machines.

In its general nature my invention comprises providing plates or wings pivoted to the sides of the fuselage of an aeroplane for example, which plates normally lie flush with the fuselage and offer no wind resistance, and means controlled by a pedal for moving the plates outwardly and inwardly as desired by the aviator.

An object of the invention is to provide such a mechanism as will be simple, strong, of light construction and easy to operate and control with a single pedal.

Further it is an object to provide a motor driven worm and nut device connected with the pivoted plate or plates continuously and connected with the motor intermittently through a reversing gear device preferably operated by a foot pedal or other similar rocking lever to throw the motor and worm into and out of gear and start and stop the motor at will.

Further, it is an object to provide a mechanism of the character stated, in which the pedal or rocking lever controls both the gear shifter and the motor circuit in proper sequence, and has provision when released to assume a neutral position with the gears out of mesh and the motor circuit open.

Further, it is an object to provide a means for operating the rudder, the elevator and the ailerons and for adjusting the position of the stabilizers without the use of considerable man power regardless of the size of the ship.

Further, it is an object to provide mechanism which may be located at any convenient place in the air ship and operated by remote control, by connecting the control lever adjacent the operator with the gear shifter located adjacent the part being controlled, via lever and rod connections, etc.

Other objects will in part be obvious and in part be pointed out hereinafter.

To the attainment of the aforesaid objects and ends, my invention consists in the novel features of construction and in the combination, connection and arrangement of parts, hereinafter more fully described, and then pointed out in the appended claims.

In the drawing:

Figure 1 is a side elevation of an areoplane with my invention applied, the mechanism within the fuselage being indicated more or less diagrammatically in dotted lines.

Figure 2 is an enlarged detail plan view of the fore part of the mechanism constituting the invention.

Figure 3 is an enlarged detail plan view of the rear part thereof.

Figure 4 is a face view of the gear shifter

Figure 6 is a diagram of the motor circuit.

Figure 8 is a perspective view of a hand-lever board with controls for the ailerons, the elevator and the stabilizers.

Figure 9 is a diagrammatic view showing how the aileron levers operate.

Figure 10 is a diagrammatic view showing how the elevator lever operates.

Figure 11 is a diagrammatic view showing how the stabilizer lever operates.

Figure 12 is a diagrammatic view showing how the rudder is operated.

Figure 7:
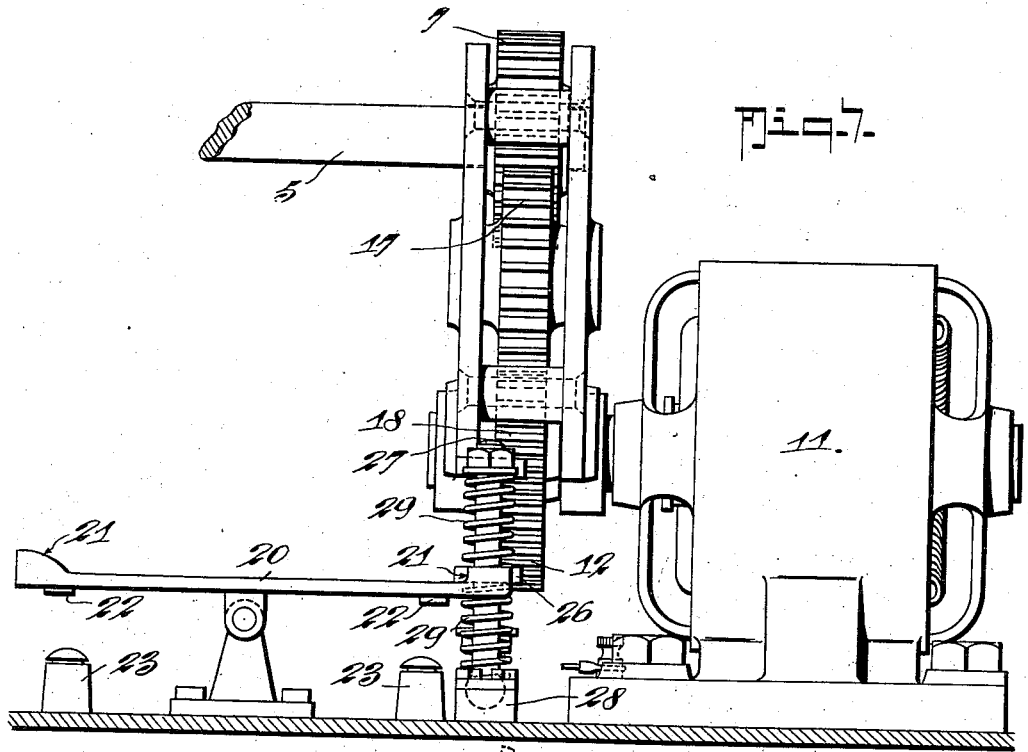
Figure 7 is an enlarged detail end view of the fore part of the mechanism constituting the invention.

In the drawing in which like numerals of reference indicate like parts in all of the figures, 1 represents an areoplane of the usual construction which, however, when my invention is to be used, is provided with air brake plates 2 preferably hinged on vertical axes 3 and normally lying flush with the fuselage or body of the aeroplane.

The air brake plates are projected and retracted by the mechanism which constitutes a principal part of my present invention. This mechanism comprises a worm shaft support 4, in bearings in which is mounted a driven worm shaft 5 having suitable thrust bearings 6 and carrying a driven gear 7 and a nut 8, which has ears 9 guided in the support 4 and held against turning around the axis of the worm shaft 5. The nut 8 is connected with the brake plates 2 by links 10.

11 designates a motor, preferably electric, which has a shaft provided with a driving gear 12. On the motor shaft is fulcrumed a gear shifter consisting of yoke plates 13 connected together and spaced apart by spacers and bolts 14, the plates 13 having slots 15 concentric with the motor shaft through which the worm shaft 4 is adapted to project.

The gear shifter yoke is pivoted at 16 on the motor shaft and carries gears 17 which are adapted to be brought into and out of mesh with the driving gear 7 as will presently be explained.

One of the gears 17 meshes continuously with the driving gear 12 while the other meshes with a reversing pinion 18 that in turn continuously meshes with the driving gear 12.

A foot pedal 20 is provided which has a dual function, namely to operate the gear shifter and to close and open the motor circuit. The pedal 20 is provided with heel and toe stops 21 for the usual purpose and it carries fore and aft contacts 22 to cooperate with the stationary contacts 23 in the motor circuit 24 in which is also contained the source of energy (battery) 25.

The foot pedal 20 has an ear 26 through which passes a rod 27 that is universally pivoted at 28 to a shiftable fixed bearing support and is provided with balancing springs 29, the rod 27 having a nut on its free end as shown.

The gear shifter yoke has an ear 31 to which is pivoted a rod with nut 30, the rod passing through an ear 32 on the pedal 20 and being provided with balancing springs 33 as indicated in Figure 4 of the drawing.

Figure 5:
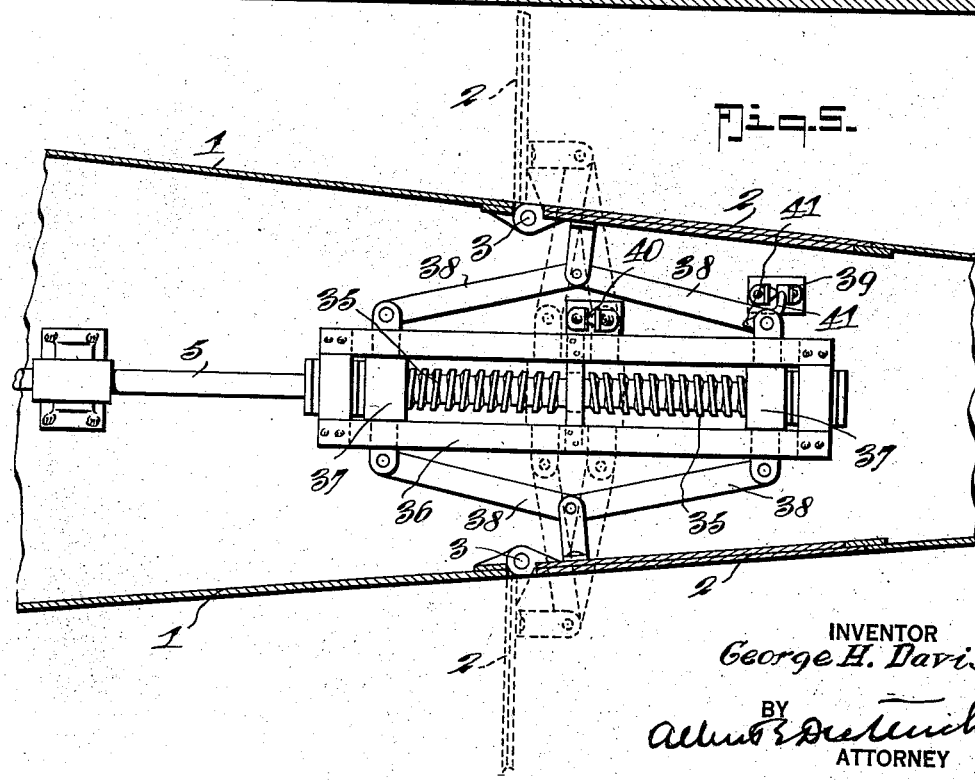
Figure 5 is a plan of the modified form of the invention showing a double worm and nut device.

In the modified form of my invention illustrated in Figure 5 it will be seen that the screw is in the nature of a double pitched screw 35 mounted in a suitable support 36 and having two nuts 37 which are connected by links 38 to the plates 2.

In order that the motor circuit may be interrupted when the plates 2 are at their extreme positions opened and closed, should the pilot not release the pedal or return it to neutral before the extreme positions of the plates 2 have been reached, I provide circuit breaking devices 39 and 40 in the motor circuit operated by pins 41 on the nut or nuts to break the circuit as the nut or nuts reach the limits of their movements in either direction. These circuit breaking devices 39 and 40 are in the nature of safety devices.

While I have illustrated by invention as particularly adapted to air brake plates of aeroplane, it is equally adaptable to the operation of any of the hinged elements of an aeroplane or airship of any kind, as for instance, the rudders, should it be found desirable to use it for those purposes, and I do not wish to be limited to the use of the invention in the embodiment illustrated, nor do I wish to be limited beyond the scope of the appended claims or as may be required by the prior art.

In the practical use of my invention, say for operating air brake plates of aeroplanes, it will, of course, be understood that the brake plates 2 normally lie flush with the body of the machine. In landing, however, it is necessary to reduce the speed of the vehicle, to a point of safety and in order to accomplish this the operator effects movement of the plates to project more or less from the body of the vehicle, thereby offering air resistance to the movement of the vehicle and slowing it down. The degree to which the plates may be projected will depend upon the length of the time the operator depresses the foot pedal.

Assume that it is desired to make a landing and the operator wishes to project the brake plates, he presses down with his toes on the foot pedal 20 which, in the first portion of its movement, causes the gear shifter to bring the forward motion gear 17 into mesh with the driven gear 7, thereby connecting the motor driving gear 12 with the driven gear 7. Further downward movement of the toe on the pedal effects a closing of the motor circuit which instantly starts the worm to turning, the nut to moving in the forward direction and the consequent extension of the brake plates 2. On releasing the pedal it will automatically be returned to the neutral position by means of the balanced spring, or the operator may himself turn it to the neutral position if desired. The first movement of the return effects a stoppage of the motor and then throws the gears out, leaving the brake plates 2 locked in the projected position by reason of the worm and nut device.

Now, when the operator wishes to return the plates 2 to their normal position he presses on the pedal with his heel, thereby causing the reverse gear train to mesh and thereafter the motor to close, whereby the movement of the worm is reversed and the plates 2 are returned to their normal position.

With but slight modification in mechanical details the invention may be used to operate the ailerons, the rudders, the elevators and to adjust the stabilizers of aerial navigating craft, thereby eliminating the use of the "stick" so I do not wish to be limited to the application of my invention to the use of airplane brakes alone.

In Figure 8 is shown a bank of levers designed to enable the operator to control the movements of the ailerons, the elevator and to adjust the stabilizers by hand. In this figure, 42 represents the ailerons which are raised and lowered by suitable cables 43 passing over pulleys 44 and connected to the nuts 8ᵃ of the worm and nut devices, the constructions of which and the cooperating motors 13 and gear shifters are the same as described in connection with the brake operating mechanism. For the aileron operation the gear shifters and motors may be located at any convenient place, the gear shifters being operated through a system of levers and connecting rods 45—46 from the levers stand 47 where the hand operated rocking levers 48 and 49 are located. These levers 48 and 49 are located close together so that they may be operated by one hand, if desired. Each hand operated lever comprises a rocking bar bar 50 corresponding in purpose and function to the foot pedal hereinbefore referred to and is provided with front and rear circuit closers to control the motor circuits of the aileron operating motors, which circuit closers and motor circuits are the same as in the first described embodiment of the invention and a further detailed description thereof need not here be repeated.

In Figure 10 is diagrammatically shown how the invention is adapted to operate the elevator 51 by the elevator operating lever 52, while in Figure 11 is shown how the stabilizers 53 may be operated or adjusted by the action of the stabilizing lever 54.

It should be understood that there is a separate motor reversing gear unit, worm and nut device and control lever for each part of the air craft that is to be operated.

Also, if desired, a set of pilot lights may be placed in view of the operator and electrically controlled and operated by the nut of the screw and nut devices (or any other desired way) to give constantly an indication to the operator of the positions of the parts operated on.

What I claim is:

1. In combination with a hinged plate, a worm shaft and nut, a link between said nut and plate, a motor, a reversing gear device for transmitting the power of said motor to said worm shaft, means normally holding said reversing gear device out of operating connection, and means associated with said reversing gear device and with said motor to move said reversing gear device into operative connection with said motor and thereafter set said motor into action.

2. In combination with a hinged plate, a worm shaft and nut, a link between said nut and plate, a motor, a reversing gear device for transmitting the power of said motor to said worm shaft, means normally holding said reversing gear device out of operating connection, means associated with said reversing gear device and with said motor to move said reversing gear device into operative connection with said motor and thereafter set said motor into action, and means to stop the action of said motor when said nut reaches the limits of its travel.

3. In combination with a hinged plate, a worm shaft and nut, a link between said nut and plate, a motor, a reversing gear device for transmitting the power of said motor to said worm shaft, means normally holding said reversing gear device out of operating connection, means associated with said reversing gear device and with said motor to move said reversing gear device into operative connection with said motor and thereafter set said motor into action, and means governed by said nut to stop the action of said motor when said nut reaches the limits of its travel.

4. In combination with a hinged plate, a worm shaft and nut, a link between said nut and plate, a motor, a reversing gear device for transmitting the power of said motor to said worm shaft, means normally holding said reversing gear device out of operating connection, and means associated with said reversing gear device and with said motor to move said reversing gear device into operative connection with said motor, said motor being electric, an operating circuit for said motor including circuit closers operated by said associated means.

5. In combination with a hinged plate, a worm shaft and nut, a link between said nut and plate, a motor, a reversing gear device for transmitting the power of said motor to said worm shaft, means normally holding said reversing gear device out of operating connection, and means associated with said reversing gear device and with said motor to move said reversing gear device into operative connection with said motor and thereafter set said motor into action, said reversing gear device comprising a pivoted gear carrier, forward and reverse gears on said carrier continuously meshing with a driving gear driven by said motor, said forward and reverse gears arranged to be alternately brought into mesh with a driven gear on said worm shaft.

6. In combination with a hinged plate, a worm shaft and nut, a link between said nut and plate, a motor, a reversing gear device for transmitting the power of said motor to said worm shaft, means normally holding said reversing gear device out of operating connection, and means associated with said reversing gear device and with said motor shaft to move said reversing gear device into operative connection with said motor, said reversing gear device comprising a pivoted gear carrier, forward and reverse gears on said carrier continuously meshing with a driving gear driven by said motor, said forward and reverse gears arranged to be alternately brought into mesh with a driven gear on said worm shaft, said motor being electric, an operating circuit for said motor including circuit closers operated by said associated means.

7. In combination with a hinged plate, a worm shaft and nut, a link between said nut and plate, a motor, a reversing gear device for transmitting the power of said motor to said worm shaft, means normally holding said reversing gear device out of operating connection, means associated with said reversing gear device and with said motor shaft to move said reversing gear device into operative connection with said motor, said motor being electric, an operating circuit for said motor including circuit closers operated by said associated means, and means to stop the action of said motor when said plates reach the limits of their movement.

8. In combination with a hinged plate, a worm shaft and nut, a link between said nut and plate, a motor, a reversing gear device for transmitting the power of said motor to said worm shaft, means normally holding said reversing gear device out of operating connection, means associated with said reversing gear device and with said motor shaft to move said reversing gear device into operative connection with said motor and thereafter set said motor into action, said reversing gear device comprising a pivoted gear carrier, forward and reverse gears on said carrier continuously meshing with a driving gear driven by said motor, said forward and reverse gears arranged to be alternately brought into mesh with a driven gear on said worm shaft, and means to stop the action of said motor when said plates reach the limits of their movement.

9. In mechanism wherein is provided a pivoted plate and a worm shaft with nut linked to said plate to move it on its pivot, an electric motor with a driving gear, a combined gear shifter and motor circuit controlling device including means for first operatively connecting said motor driving gear with said worm shaft and then effecting operation of said electric motor.

10. In mechanism wherein is provided a pivoted plate and a worm shaft with nut linked to said plate to move it on its pivot, an electric motor with a driving gear, a combined gear shifter and motor circuit controlling device including means for first operatively connecting said motor driving gear with said worm shaft and then effecting operation of said electric motor, and means automatically opening the motor circuit upon completion of the movement of said plate in either direction.

11. In aeroplanes having air brake plates shiftably mounted thereon, means to project and retract said plates, said means comprising an electric motor, a motor energizing circuit, a power transmitting and translating device connecting said motor with said plates and including a reversing gear mechanism, an aviator operated means for first setting said reversing gear mechanism to operative position and then closing the motor circuit.

12. In aeroplanes having air brake plates shiftably mounted thereon, means to project and retract said plates, said means comprising an electric motor, a motor energizing circuit, a power transmitting and translating device connecting said motor with said plates and including a reversing gear mechanism, an aviator operated means for first setting said reversing gear mechanism to operative position and then closing the motor circuit, and another means automatically to open the motor circuit when said plates reach the limits of their movements.

13. In apparatus of the class described, an electric motor having a shaft with a driving gear, a motor energizing circuit, a driven shaft, a driven gear on said driven shaft, a gear shifter pivoted on the motor shaft, forward and reverse gears carried by said shifter in continuous mesh with said driving gear and shiftable into and out of mesh with said driven gear, yieldable balancing means normally holding said shifter with its gears out of mesh with said driven gear, a rockably mounted switch in said motor circuit for closing and opening the same, and a connection between said switch and said shifter.

14. In apparatus of the class described, an electric motor having a shaft with a driving gear, a motor energizing circuit, a driven shaft, a driven gear on said driven shaft, a gear shifter pivoted on the motor shaft, forward and reverse gears carried by said shifter in continuous mesh with said driving gear and shiftable into and out of mesh with said driven gear, yieldable balancing means normally holding said shifter with its gears out of mesh with said driven gear, a rockably mounted switch in said motor circuit for closing and opening the same a connection between said switch and said shifter, and including means whereby said shifter is moved to mesh the gears in advance of the closing of the motor circuit.

15. In apparatus of the class described, an electric motor having a shaft with driving gear, a motor energizing circuit, a driven shaft, a driven gear on said driven shaft, a gear shifter pivoted on the motor shaft, forward and reverse gears carried by said shifter in continuous mesh with said driving gear and shiftable into and out of mesh with said driven gear, yieldable balancing means normally holding said shifter with its gears out of mesh with said driven gear, a rockably mounted pedal switch in said motor circuit for closing and opening the same, and a yieldably balanced connection between the pedal of said pedal switch and said shifter to move said shifter to mesh said gears before closing the motor circuit.

16. In apparatus wherein is provided an electric motor with driving shaft and driving gear, and a motor energizing circuit; a driven shaft with a driven gear, shiftable forward and reverse gearing between the driving and driven gears, a gear shifter, means normally holding said shifter in a neutral position and including an operating pedal, a rod connecting said shifter and said pedal, balancing springs on said rod and yieldable means to hold said pedal in a neutral position.

17. In apparatus wherein is provided an electric motor with driving shaft and driving gear, and a motor energizing circuit; a driven shaft with a driven gear, shiftable forward and reverse gearing between the driving and driven gears, a gear shifter means normally holding said shifter in a neutral position and including an operating pedal, a rod connecting said shifter and said pedal, balancing springs on said rod and yieldable means to hold said pedal in a neutral position, circuit closers in said motor circuit and associated with said pedal for the purpose described.

18. In aeroplanes having shiftable controlling plane-like elements, means to shift said elements, said means comprising an electric motor, a motor energizing circuit, a power transmitting and translating device connecting said motor with said elements and including a reverse gear mechanism, an aviator operated means for first setting said reverse gear mechanism to operative position and then closing the motor circuit.

19. In aeroplanes having shiftable controlling plane-like elements, means to shift said elements, said means comprising an electric motor, a motor energizing circuit, a power transmitting and translating device connecting said motor with said elements and including a reverse gear mechanism, an aviator operated means for first setting said reverse gear mechanism to operative position, then closing the motor circuit, and another means automatically to open the motor circuit when said plane-like elements reach the limits of their movements.

GEORGE H. DAVIS.